(12) United States Patent
Jepsen et al.

(10) Patent No.: US 6,484,872 B1
(45) Date of Patent: Nov. 26, 2002

(54) BELT FOR A CONVEYOR

(75) Inventors: Carsten Jepsen, Hamburg (DE);
Karl-Heinz Elvers, Buxtehude (DE);
Adolfo Kropf-Eilers, Hamburg (DE)

(73) Assignee: Phoenix Aktiengesellschaft, Hamburg (DE)

( * ) Notice: Subject to any disclaimer, the term of this patent is extended or adjusted under 35 U.S.C. 154(b) by 0 days.

(21) Appl. No.: 09/646,083

(22) PCT Filed: Mar. 10, 1999

(86) PCT No.: PCT/DE99/00635

§ 371 (c)(1),
(2), (4) Date: Sep. 13, 2000

(87) PCT Pub. No.: WO99/47437

PCT Pub. Date: Sep. 23, 1999

(30) Foreign Application Priority Data

Mar. 17, 1998 (DE) .......................... 198 11 413

(51) Int. Cl.⁷ .............................................. B65G 15/34
(52) U.S. Cl. ........................................................ 198/847
(58) Field of Search .......................................... 198/847

(56) References Cited

U.S. PATENT DOCUMENTS

| 660,027 | A | * | 10/1900 | Proctor | 160/383 |
|---|---|---|---|---|---|
| 705,876 | A | * | 7/1902 | Selleck | 198/846 |
| 2,425,575 | A | * | 8/1947 | Suloff | 198/847 |
| 3,224,566 | A | * | 12/1965 | Elliott | 156/137 |
| 3,352,408 | A | * | 11/1967 | Thompson | 198/833 |
| 3,664,490 | A | * | 5/1972 | Maruyama | 198/847 |
| 4,484,903 | A | * | 11/1984 | Schneider | 474/201 |
| 4,623,419 | A | * | 11/1986 | Price | 100/211 |
| 4,667,812 | A | * | 5/1987 | Wixey | 198/821 |
| 4,819,791 | A | * | 4/1989 | Melander | 198/818 |
| 5,004,098 | A | * | 4/1991 | Marshall | 198/821 |
| 5,328,023 | A | * | 7/1994 | Hinkelmann et al. | 198/819 |
| 5,369,477 | A | * | 11/1994 | Foote et al. | 198/840 |

FOREIGN PATENT DOCUMENTS

| DE | 1 148 181 | 5/1963 |
|---|---|---|
| DE | 2 217 077 | 10/1973 |
| DE | 30 08 169 | 9/1981 |
| DE | 44 33 755 | 3/1996 |
| DE | 44 36 042 | 4/1996 |

* cited by examiner

Primary Examiner—Chrlstopher P. Ellis
Assistant Examiner—Richard Ridley
(74) Attorney, Agent, or Firm—Collard & Roe, P.C.

(57) ABSTRACT

The invention relates to belt (1) for a conveyor. The inventive belt is made of rubber or a plastic similar to rubber and is provided with incorporated traction carriers (2) in the form of cables or cords that are made of steel. The inventive conveyor belt comprises, in relation to its total width (B), a center part (A) and two side parts (A'). The invention is characterized in that the center part (A) is interchangeable as a result of a joint (4) between both side parts (1'). Various embodiments of said joint (1) are described.

10 Claims, 2 Drawing Sheets

BELT FOR A CONVEYOR

The invention relates to a conveyor belt made of rubber or a plastic material similar to rubber, with embedded traction carriers in particular in the form of cables or cords which, in turn, particularly are made of steel, whereby the conveyor belt comprises with respect to its total width a center part and two side parts (DE-A-44 33 755; DE-A-44 36 042).

The center part of a conveyor belt is, in the normal case, stressed to a higher degree than the two side parts. Now, when the center part was worn or damaged, it was necessary heretofore, as a rule, to replace the entire conveyor belt, whereas it was possible to continue to use other parts of the conveyor installation.

Laid-open patent DE-B-1 148 81 describes a hose conveyor belt installation in connection with which it is possible, in a reversed way, to replace the longitudinal profiled strips—which are susceptible to wear—by means of detachable pull-out elements, whereas the conveyor belt is used further.

Now, with the conveyor belt as defined by the invention and characterized in claim 1, it is possible to remove a worn or damaged center part of a conveyor belt and to replace said center part by a new one, using a joint. The two side parts, however, are used further without being replaced.

With respect to the joint between the center part and the two side parts of the conveyor belt, use is advantageously made of the following variations:

Variation I

The center part is mechanically joined with the two side parts, specifically on the basis of a plug-groove principle. The design variations that are useful in this regard are described as follows:

The plug-groove principle is realized in such a way that the groove and the corresponding plug part are aligned in the direction of the carrying (top) side or running (bottom) side of the conveyor belt. The groove and the corresponding plug part each have a substantial trapezoidal cross sectional shape, or said parts change into each other substantially in the form of a wave.

Reinforcing materials consisting of steel or synthetic materials are advantageously present within the zone of the joint. The reinforcement may be an angle-shaped part that extends in the longitudinal direction of the conveyor belt, such shaped part being usefully made from steel fabric. Another possibility is to realize the reinforcement in such a way that it consists of at least one cable or cord extending in the longitudinal direction of the conveyor belt.

The plug-groove principle is realized in such a way that the groove and the corresponding plug part are aligned in the direction of the center part or side parts, preferably in the direction of the center part. The groove and the corresponding plug part extend in this connection substantially in the form of a wedge, whereby the deepest point of the groove or the peak of the plug part are approximately located at the level of the center plane of the conveyor belt, said plane extending parallel with the carrying or running side of the conveyor belt.

Irrespective of the possibilities introduced above for realizing the joint, the effectiveness of the mechanical joint of the center part with the two side parts can be increased within the zone of the joint by means of cold gluing or hot vulcanization.

Variation II

The joint of the center part with the two side parts is produced by means of a groove, which is located within the zone of the joint and extends from the carrying and/or running side of the conveyor belt in the direction of the center plane of the conveyor belt, said center plane extending parallel with the carrying or running side, whereby the groove is filled with a compound that can be vulcanized. The groove advantageously extends substantially in the form of a wedge.

Entirely irrespective of the variations introduced above, the conveyor belt as defined by the invention is usefully characterized also by the following design possibilities:

The joint between the center part and the two side parts is designed in such a way that a smooth surface is produced in the site of the joint in relation to the carrying side and the running side of the conveyor belt.

The center part has a width amounting to 0.3 to 0.8 times the overall width of the conveyor belt.

The traction carriers are located either in the two side parts or in the center part. The traction carriers are advantageously arranged exclusively in the two side parts, whereas the center part, which is substantially free of traction carriers, has an embedded conveyor belt carrier that particularly consists of a fabric. The number of fabric layers of the conveyor belt amounts to between 1 and 6. Polyamide, polyester, synthetic silk (rayon), rayon, cotton, aramide or steel are used as materials for said fabric; however, a fabric consisting of a mixture of said materials can be employed as well.

Now, the invention is explained in the following with the help of exemplified embodiments and by reference to schematic drawings (cross sectional representations), in which.

Figure 1:
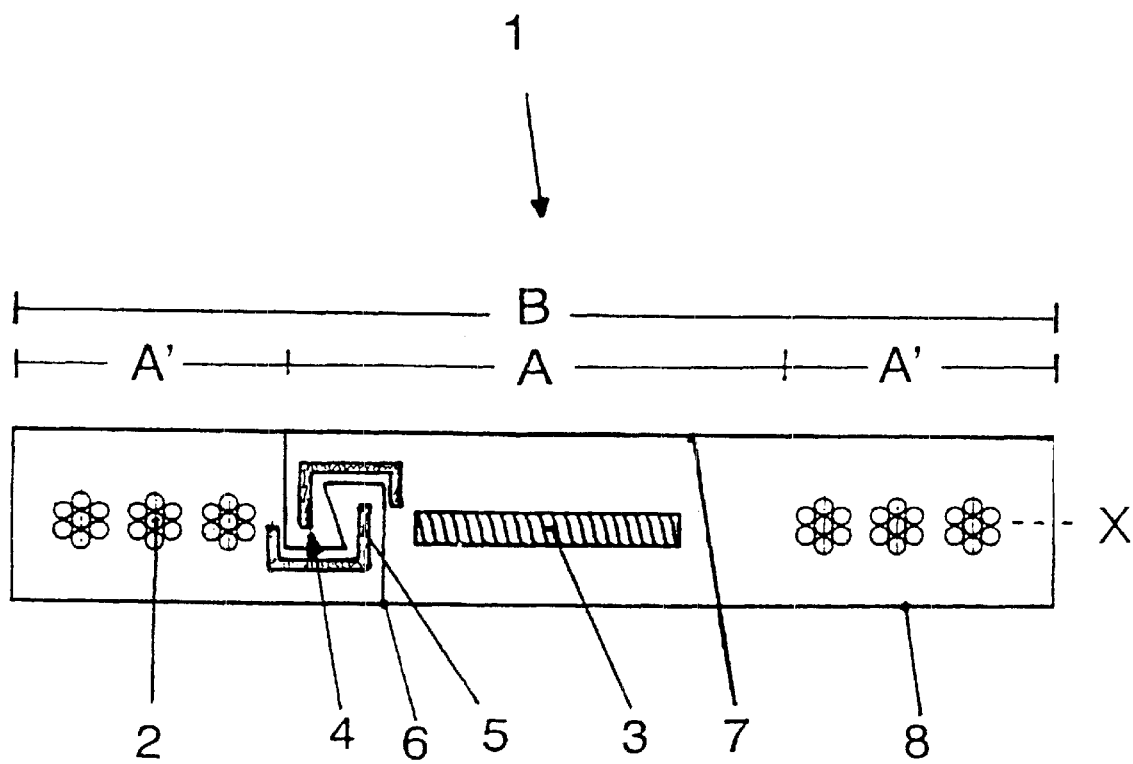
FIG. 1 shows a conveyor belt with a joint based on a plug-groove principle, using an angle-shaped part as the reinforcement of the zone of the joint.

The following list of reference numerals and symbols is applicable to said figures:

1,1',1",1'" Conveyor belt
2 Traction carriers in the form of cables or cords
3 Conveyor belt carriers
4,4',4",4'" Joint between the center part and the two side parts
5,5 ' Reinforcement of the zone of the joint
6 Joint
7 Carrying side
8 Running side
9 Groove
10 Vulcanizable compound
A Center part of the conveyor belt
A' Side part of the conveyor belt
B Overall width of the conveyor belt
X Center plane of the conveyor belt According to FIG. 1, the two side parts A' of the conveyor belt 1 are provided with the embedded traction carriers 2 in the form of steel cables or steel cords. An embedded conveyor belt carrier 3 made of fabric is located within the center part A, which is free of traction carriers. Since the center part A substantially has no traction-carrying function, it can be connected in the traveling direction in a simple mechanical way.

The mechanical joint 4 of the center part A with the two side parts A', which is shown here only once, is made on the basis of a plug-groove principle, which is designed in such a way that the groove and the corresponding plug part are aligned in the direction of the carrying side 7 or running side 8 of the conveyor belt. The groove and the corresponding plug part each have a substantially trapezoidal cross sectional shape.

An angle-shaped part 5 serving as the reinforcing element and extending in the longitudinal direction of the conveyor belt is arranged within the zone of the joint, said shaped part particularly consisting of a steel fabric.

Furthermore, the joint 4 of the center part A with the two side parts A' is designed in such a way that a smooth surface is produced in the joint site 6 in relation to the carrying side 7 and the running side 8 of the conveyor belt 1. In this way, no material-wearing relative motions can occur.

The transverse forces are primarily transmitted in the center plane X of the conveyor belt, where the traction carriers 2 are located. The material is under pressure in the visible sites of the joint. For this reason, traction or minor bending stresses will not cause the sites of the joint to open. The pressure is maintained by excess rubber or material similar to rubber.

Figure 2:
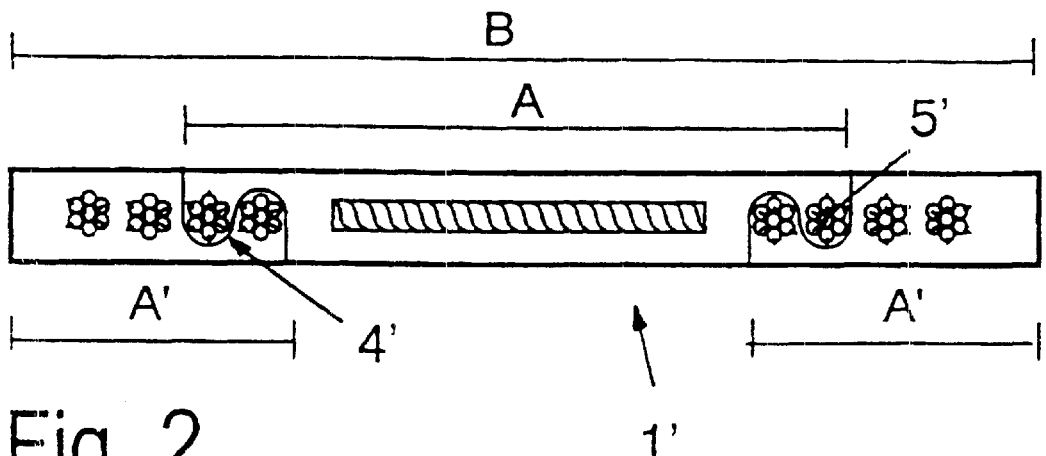
FIG. 2 shows a conveyor belt with a joint based on a plug-groove principle using cables or cords as the reinforcement of the zone of the joint.

Now, FIG. 2 shows a conveyor belt 1', whereby the joint 4 of the center part A with the two side parts A' is produced based on a plug-groove principle as well. In the present embodiment, the groove and the corresponding plug part change into one another substantially in the form of a wave.

Two cables 5' or cords extending in the longitudinal direction of the conveyor belt are arranged within the joint 4', said cables or cords leading to a reinforcement within the zone of the joint.

Figure 3:
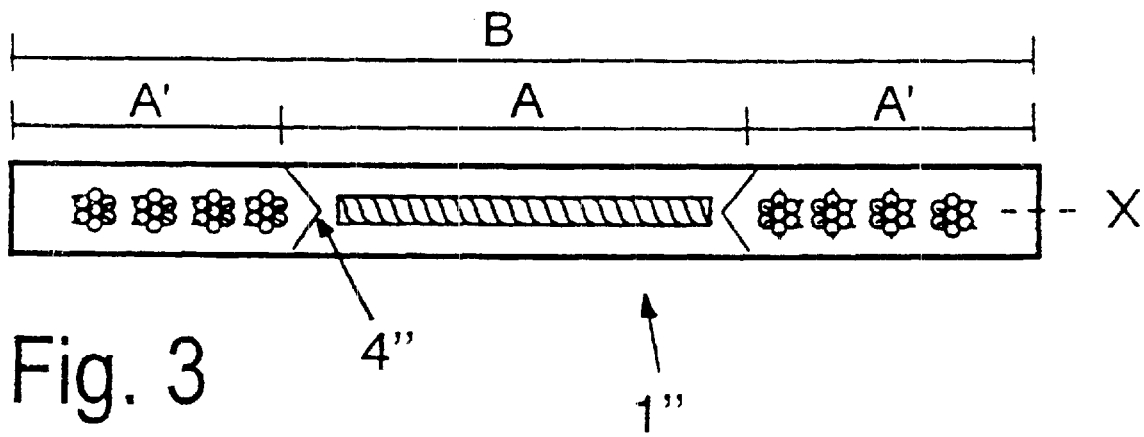
FIG. 3 shows a conveyor belt with a joint based on a wedge-shaped plug-groove principle.

According to FIG. 3, the conveyor belt 1' has a joint 4", which is produced based on a plug-groove principle in the present case as well. As opposed to the exemplified embodiments according to FIGS. 1 and 2, however, the groove and the corresponding plug part are aligned in the direction of the center part A, specifically in connection with a substantially wedge-shaped construction. The deepest point of the groove, or the peak of the corresponding plug part are in this connection located approximately at the level of the center plane X of the conveyor belt.

Figure 4:
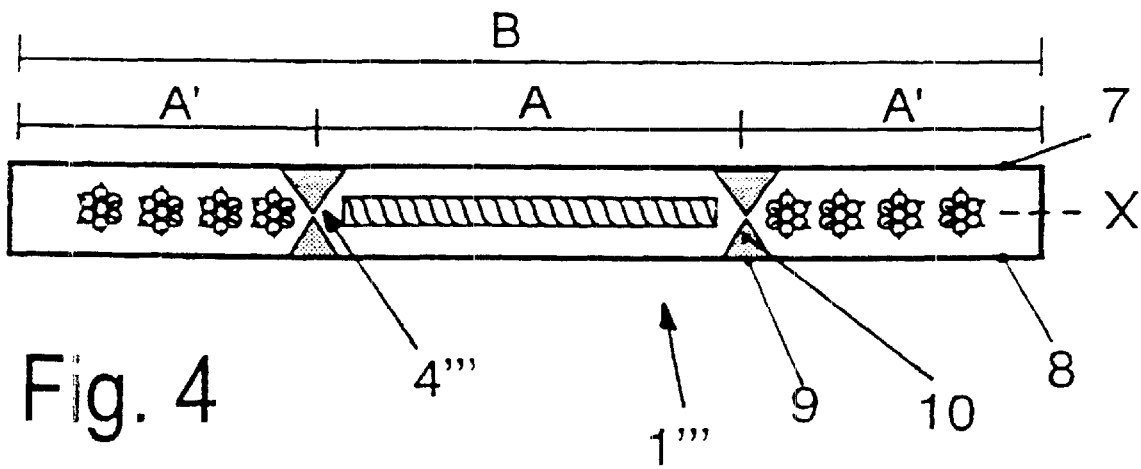
FIG. 4 shows a conveyor belt with a joint using wedge-shaped grooves, which are filled with a compound that can be vulcanized.

FIG. 4, now, shows a conveyor belt 1''' based on an entirely different connection principle. The joint 4''' of the center part A with the two side parts A' is established in each case by means of the two grooves 9, which are located within the zone of the joint and extend from the carrying side 7, on the one hand, and also from the running side 8, on the other hand, in the direction of the center plane X of the conveyor belt. The grooves are provided with a substantially wedge-like shape. Said grooves are filled with a compound that can be vulcanized, so that an effective joint is formed following the vulcanization step.

In the exemplified embodiments according to FIGS. 1 to 4, the center part A has a width amounting to 0.3 to 0.8 times the overall width B of the conveyor belt 1, 1', 1" and 1'''. The overall width B relates in this connection exclusively to the conveyor belt without any lateral parts of the installation that may be present, i.e. as shown, for example in DE-B-1 148 181 cited above.

What is claimed is:
1. A conveyor belt made from an elastic material, the belt comprising:
 a) a replaceable center part of said conveyor belt;
 b) a plurality of side parts;
 c) a plurality of traction carriers which are formed from a plurality of steel cables and disposed in said conveyor belt; and
 d) a mechanical joint which joins said replaceable center part with said plurality of side parts, said mechanical joint comprising a plug and a groove which couple together to form a connection wherein said groove and said corresponding plug each have a substantially trapezoidal cross-section.

2. The conveyor belt as in claim 1 further comprising a reinforcement material disposed in said mechanical joint for reinforcing said mechanical joint.

3. The conveyor belt as in claim 2 wherein said reinforcement material comprises steel.

4. A conveyor belt made from an elastic material, the belt comprising:
 a) a replaceable center part of said conveyor belt;
 b) a plurality of side parts;
 c) a plurality of traction carriers which are formed from a plurality of steel cables and disposed in said conveyor belt; and
 d) a mechanical joint which joins said replaceable center part with said plurality of side parts, said mechanical joint comprising a plug and a groove which couple together to form a connection; and
 e) at least one angle shaped reinforcement disposed in said mechanical joint wherein said at least one angled reinforcement is for reinforcing said mechanical joint.

5. The conveyor belt according to claim 4, wherein said at least one angle shaped reinforcement is made from steel fabric.

6. The conveyor belt as in claim 1, wherein said mechanical joint including said plug and said groove join said replaceable center part with said side parts to form a substantially smooth surface for a carrying side of the conveyor belt.

7. A conveyor belt made from an elastic material, the belt comprising:
 a) a plurality of traction carriers which are formed from a plurality of steel cables and disposed in said elastic material;
 b) a replaceable center part of said conveyor belt;
 c) a plurality of side parts;
 d) a mechanical joint which joins said replaceable center part with said plurality of side parts, wherein said traction carriers are exclusively located in said plurality of side parts; and
 e) a conveyor belt carrier comprising a fabric and embedded in said replaceable center part.

8. The conveyor belt as in claim 4, wherein said conveyor belt carrier includes at least one fabric layer.

9. The conveyor belt as in claim 5, wherein said conveyor belt carrier includes no more than six fabric layers.

10. The conveyor belt as in claim 5, wherein said conveyor belt carrier comprises at least one material selected from the group consisting of polyamide, polyester, synthetic silk, rayon, cotton, aramide, or steel.

* * * * *